(12) United States Patent
Foote et al.

(10) Patent No.: US 7,634,779 B2
(45) Date of Patent: Dec. 15, 2009

(54) INTERPRETATION OF DVD ASSEMBLY LANGUAGE PROGRAMS IN JAVA TV-BASED INTERACTIVE DIGITAL TELEVISION ENVIRONMENTS

(75) Inventors: William F. Foote, Los Angeles, CA (US); Jonathan D. Courtney, Richardson, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 577 days.

(21) Appl. No.: 10/301,321

(22) Filed: Nov. 20, 2002

(65) Prior Publication Data

US 2004/0098730 A1     May 20, 2004

(51) Int. Cl.
*G06F 9/44* (2006.01)
*H04N 7/173* (2006.01)

(52) U.S. Cl. ............ 719/328; 719/322; 725/87
(58) Field of Classification Search .......... 719/322, 719/324, 318, 310, 320, 328; 709/200–253; 455/1–899; 725/39, 86, 87, 100, 101, 104, 725/139, 151; 348/14.05
See application file for complete search history.

(56) References Cited

U.S. PATENT DOCUMENTS

| | | | |
|---|---|---|---|
| 5,742,802 A | | 4/1998 | Harter et al. |
| 5,929,857 A | | 7/1999 | Dinallo et al. |
| 5,931,908 A | * | 8/1999 | Gerba et al. ............ 709/219 |
| 6,009,261 A | | 12/1999 | Scalzi et al. |
| 6,519,594 B1 | * | 2/2003 | Li .............................. 707/10 |
| 6,539,437 B1 | * | 3/2003 | Windheim et al. .......... 719/330 |
| 6,608,966 B1 | * | 8/2003 | Anderson et al. ............ 386/68 |
| 6,981,042 B1 | * | 12/2005 | Rey ............................ 709/225 |
| 7,079,113 B1 | * | 7/2006 | Hayes et al. ................. 345/158 |
| 2002/0194618 A1 | * | 12/2002 | Okada et al. ................. 725/132 |
| 2003/0145321 A1 | * | 7/2003 | Bates et al. ................... 725/25 |

FOREIGN PATENT DOCUMENTS

EP       852 443       7/1998

OTHER PUBLICATIONS

"Computer Dictionary," Third Edition, Microsoft Press, 1997; pp. 69, 261 and 268.*
Bart Calder et al., "Java TV™ API Technical Overview: The Java TV API Whitepaper", Nov. 14, 2000, Copyright © 1998, 1999, 200 Sun Microsystems, Inc., Palo Alto, CA 94303, Version 1.0, pp. i-52.
Examination Report dated Jun. 14, 2005 from the corresponding EP Application No. 03 257 306.5, 4 pages.

* cited by examiner

*Primary Examiner*—Van H Nguyen
(74) *Attorney, Agent, or Firm*—Dorsey & Whitney LLP

(57) ABSTRACT

Techniques for interpretation of DVD assembly language programs for television (TV) receivers operating in Java TV environments are provided. The techniques can be used to implement a Java-based command/control enabling system. The Java-based command/control enabling system can be implemented as a Java-based DVD assembly language interpreter which interacts with various modules including video, audio, graphics overlay, and remote control modules. As such, the Java-based command/control enabling systems can provide similar command/control functions as those provided by DVD systems.

18 Claims, 6 Drawing Sheets

INTERPRETATION OF DVD ASSEMBLY LANGUAGE PROGRAMS IN JAVA TV-BASED INTERACTIVE DIGITAL TELEVISION ENVIRONMENTS

BACKGROUND OF THE INVENTION

The present invention relates generally to Java computing environments and, more particularly, to techniques for providing command control capabilities for receivers operating in Java TV environments.

Digital television (DTV) is the transmission of television signals using digital rather than conventional analog methods. Analog transmission is in the form of a variable wave. Digital transmission consists of an electrical pulse which has two possibilities: on and off (or positive and negative), which are represented by a one and a zero (this is binary data, the same type of information that a computer understands). Because a digital signal does not fluctuate, but is either perfectly intact or totally absent, a digital transmission is more precise than an analog transmission. Although both signals are transmitted in the same basic way and have the same range, they behave differently at the limits of their ranges. An analog signal degrades over distance and may be barely detectable at the further reaches of the broadcast area—this is why the signal from a distant radio station fades in and out. As the signal reaches the farthest limits of its range, the signal-to-noise ratio (SNR) decreases and the quality of the broadcast suffers, although the range remains the same. In comparison, when the SNR decreases in a digital signal, the quality of the broadcast does not degrade, but the range shrinks (this is called the cliff effect). Accordingly, the advantages of DTV over analog TV include: superior image resolution (detail) for a given bandwidth, smaller bandwidth for a given image resolution, compatibility with computers and the Internet, interactivity, superior audio quality, consistency of reception over varying distances, and capacity for multicasting.

Conventional standards, NTSC, PAL, and SECAM, specify analog transmission. However, both the audio and video components of a television signal can be transmitted in digital form. Because much more data can be sent digitally, a digital transmission will allow, depending on the display format chosen, either a dramatically improved resolution and sound quality in the case of high definition television (HDTV), or simultaneous broadcasts (multicasting) of up to five programs in the case of standard definition television (SDTV). Another SDTV option, known as datacasting, is the transmission of data such as games, still pictures, and other material while the viewer is watching a program. Datacasting might allow, for example, someone watching a baseball game to choose a different camera angle or to select a display of player or team statistics.

The attraction of DTV is not only the clearer picture and higher quality sound, but the ability to interact with the television program that is being broadcast. Interaction could include a viewer playing a game while watching an educational program, downloading a recipe from a favorite cooking show, or choosing a program to watch from an electronic program guide (EPG). An EPG is an onscreen television guide that displays channel and program information at no extra cost to the viewer. In DTV, the EPG is sent as a separate data packet in the MPEG-2 transport stream.

There are two types of EPGs: text-based and multimedia. A text-based EPG is similar to a printed television guide. A multimedia EPG allows the viewer to choose and record a program once, daily or weekly at the touch of a button on the remote, sort through movies by theme, review top national and world news stories, and access comprehensive coverage of news, weather, sports, and entertainment stories. A typical multimedia EPG includes channel grids that contain present and future television programs along with a video window that displays a current broadcast from a selected channel and a brief description of the program.

Another recent development is the production of Digital Versatile Disc (DVD) for general use. DVD is an optical disc technology that is expected to rapidly replace the disc (as well as the audio compact disc). The DVD holds 4.7 gigabytes of information on one of its two sides, or enough for a 133-minute movie. With two layers on each of its two sides, it will hold up to 17 gigabytes of video, audio, or other information. (Compare this to the current CD-ROM disc of the same physical size, holding 600 megabytes). The DVD can hold more than 28 times as much information.

DVD-Video is the usual name for the DVD format designed for full-length movies and is a box that will work with your television set. DVD-ROM is the name of the player that will (sooner or later) replace your computer's CD-ROM. It will play regular CD-ROM discs as well as DVD-ROM discs. DVD-RAM is the writable version of DVD-ROM. DVD-Audio is a player designed to replace the compact disc player. DVD uses the MPEG-2 file and compression standard. MPEG-2 images have four times the resolution of MPEG-1 images and can be delivered at 60 interlaced fields per second where two fields constitute one image frame (MPEG-1 can deliver 30 noninterlaced frames per second). Audio quality on DVD is comparable to that of current audio compact discs.

DVD-Video Discs usually contain an application that presents menus to the viewer, and allows him to control aspects of the video presentation. For example, the applications allow the viewer to jump to a specific scene, control subtitling, select camera angles, select audio tracks, etc. These applications also display graphic images on the screen, and allow highlighting of choices and navigation using the remote control. DVD control applications are written in DVD Assembly Language.

The conventional Java-based interactive Digital TV environment can provide the user with the same command control capabilities as provided in the DVD environment. However, the conventional Java-based interactive Digital TV environment does not recognize DVD assembly language. As a result, conventional environments suffer many drawbacks. By way of example, users of Video on Demand (VOD) do not have the capability to pause, rewind, fast forward, etc. It should be noted that the consumers accessing Video on Demand movie sites usually are doing so over high-speed or broadband connections, such as through cable modem services, or Digital Subscriber Loops (DSL), which are becoming more popular.

Accordingly, an improved digital TV environment is needed.

SUMMARY OF THE INVENTION

Broadly speaking, the present invention relates to techniques for providing interpretation of DVD assembly language programs for television (TV) receivers operating in a digital TV environment. In accordance with one aspect of the invention, a Java TV environment including a Java-based command/control enabling system is shown. The Java-based command/control enabling system can be implemented as a Java-based DVD assembly language interpreter which interacts with various modules including video, audio, graphics overlay, and remote control modules. As such, the Java-based command/control enabling systems can provide similar command/control functions to those provided by DVD systems.

The invention can be implemented in numerous ways, including as a method, an apparatus, a computer readable medium. Several embodiments of the invention are discussed below.

One embodiment of the invention can be implemented as a Java-based command/control enabling system operating in a Java TV environment. The Java-based command/control enabling system is capable of interacting with a Java TV Application Programming Interface (API). Furthermore, the Java-based command/control enabling system is capable of operating to: read a DVD assembly language instruction corresponding to a command for performing an operation associated with a television receiver operating in the Java TV environment; decode the DVD assembly language instruction in order to determine a DVD assembly language op-code; and execute the DVD assembly language op-code.

As a method of providing remote control capabilities in a Java TV environment, one embodiment of the invention includes the acts of: providing a Java TV Application Programming Interface; receiving a remote control key code corresponding to a command for performing an operation associated with a television receiver operating in the Java TV environment; translating the remote control key code to a DVD assembly language key code; and storing the DVD assembly language key code in memory where it can be accessed by a DVD assembly language program.

As a computer readable medium including computer program code for a Java-based command/control enabling system capable of interacting with a Java TV Application Programming Interface, one embodiment of the invention includes: computer program code for reading a DVD assembly language instruction corresponding to a command for performing an operation associated with a television receiver operating in a Java TV environment; computer program code for decoding the DVD assembly language instruction in order to determine a DVD assembly language op-code; and computer program code for executing said DVD assembly language op-code.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background, digital television and DVD are becoming more popular. DVD users can select various options, including special features, by interacting with a menu. Typically, a remote control device can be used to enter commands. This can be done by pressing one or more input keys of the remote control device. In this way, the DVD users can control presentation of video, audio, text, special features, etc. These capabilities are provided using DVD assembly language programs. Conventional digital television (TV) environments provide similar capabilities, but do not allow execution of DVD assembly language programs.

Accordingly, the invention pertains to for providing interpretation of DVD assembly language programs for television (TV) receivers operating in a digital TV environment. In accordance with one aspect of the invention, a Java TV environment including a Java-based command/control enabling system is shown. The Java-based command/control enabling system can be implemented as a Java-based DVD assembly language interpreter which interacts with various modules including video, audio, graphics overlay, and remote control modules. As such, the Java-based command/control enabling systems can provide similar command/control functions to those provided by DVD systems.

Embodiments of the invention are discussed below with reference to FIGS. 2-6. However, those skilled in the art will readily appreciate that the detailed description given herein with respect to these figures is for explanatory purposes only as the invention extends beyond these limited embodiments.

Figure 1:
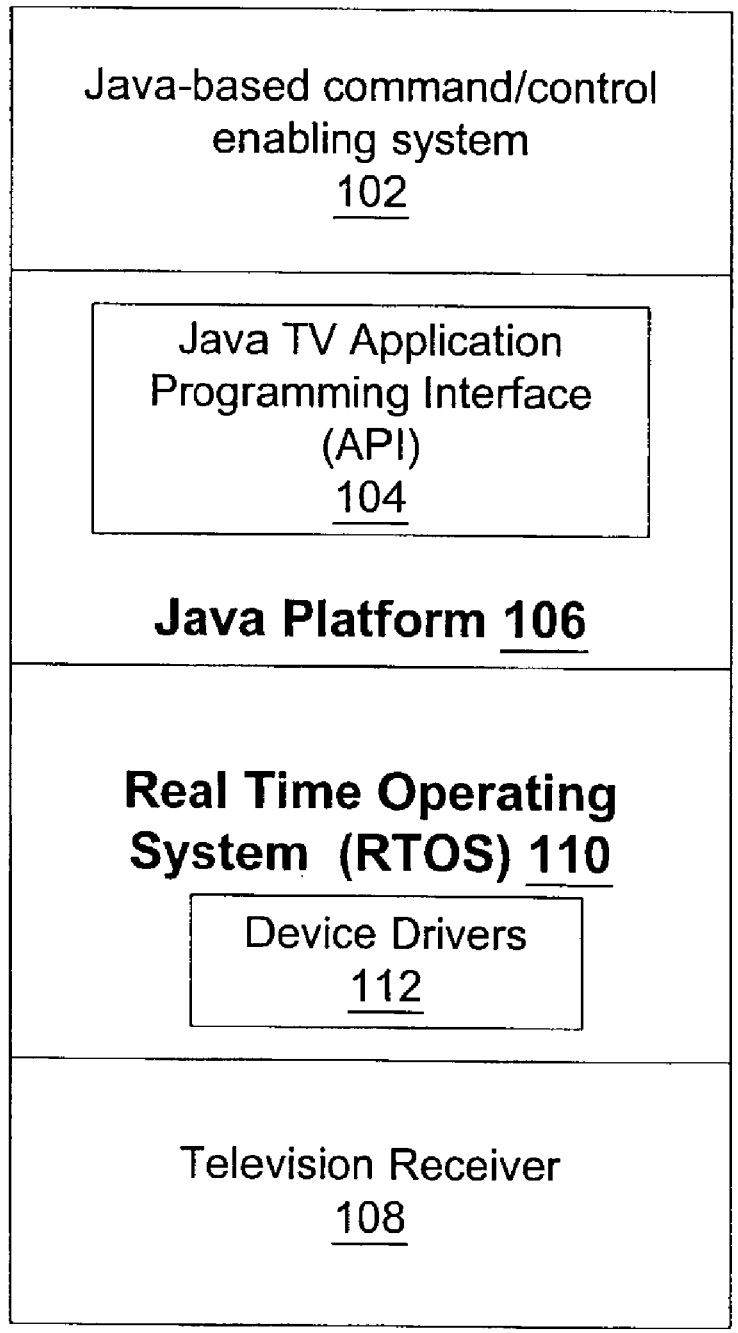
FIG. 1 illustrates a Java TV environment including a Java-based command-control enabling system in accordance with one embodiment of the invention.

FIG. 1 illustrates a Java TV environment 100 including a Java-based command-control enabling system 102 in accordance with one embodiment of the invention. As illustrated in FIG. 1, the Java-based command/control enabling system 102 is capable of interacting with a Java TV Application Programming Interface (API) 104 operating in a Java platform 106. As will be appreciated, the Java TV Application Programming Interface (API) 104 can be implemented as an extension of the Java platform 106. The Java TV Application Programming Interface (API) 104 can be used to provide Java-based interactive content.

As shown in FIG. 1, the Java TV environment 100 includes a television receiver 108. Typically, the television receiver 108 is a digital receiver. However, it should be noted that the television receiver 108 may be able to process analog and/or digital signals. The signals, for example, can be broadcast to receivers over terrestrial cable or satellite networks. By way of example, these signals can be used to provide users with Video on Demand (VOD). It should be noted that the consumers accessing Video on Demand movie sites usually are doing so over high-speed or broadband connections, such as through cable modem services or Digital Subscriber Loops (DSL), which are becoming more popular.

It should also be noted that the Java TV environment 100 includes a Real Time Operating System (RTOS) 110 which supports device drivers 112 for the television receiver 108. However, the Java-based command/control enabling system 102 can be implemented as an application using the Java TV Application Programming Interface (API) 104. This provides a layer of abstraction. As such, the command/control enabling system 102 can be implemented irrespective of the operating system and/or hardware details.

Figure 2:
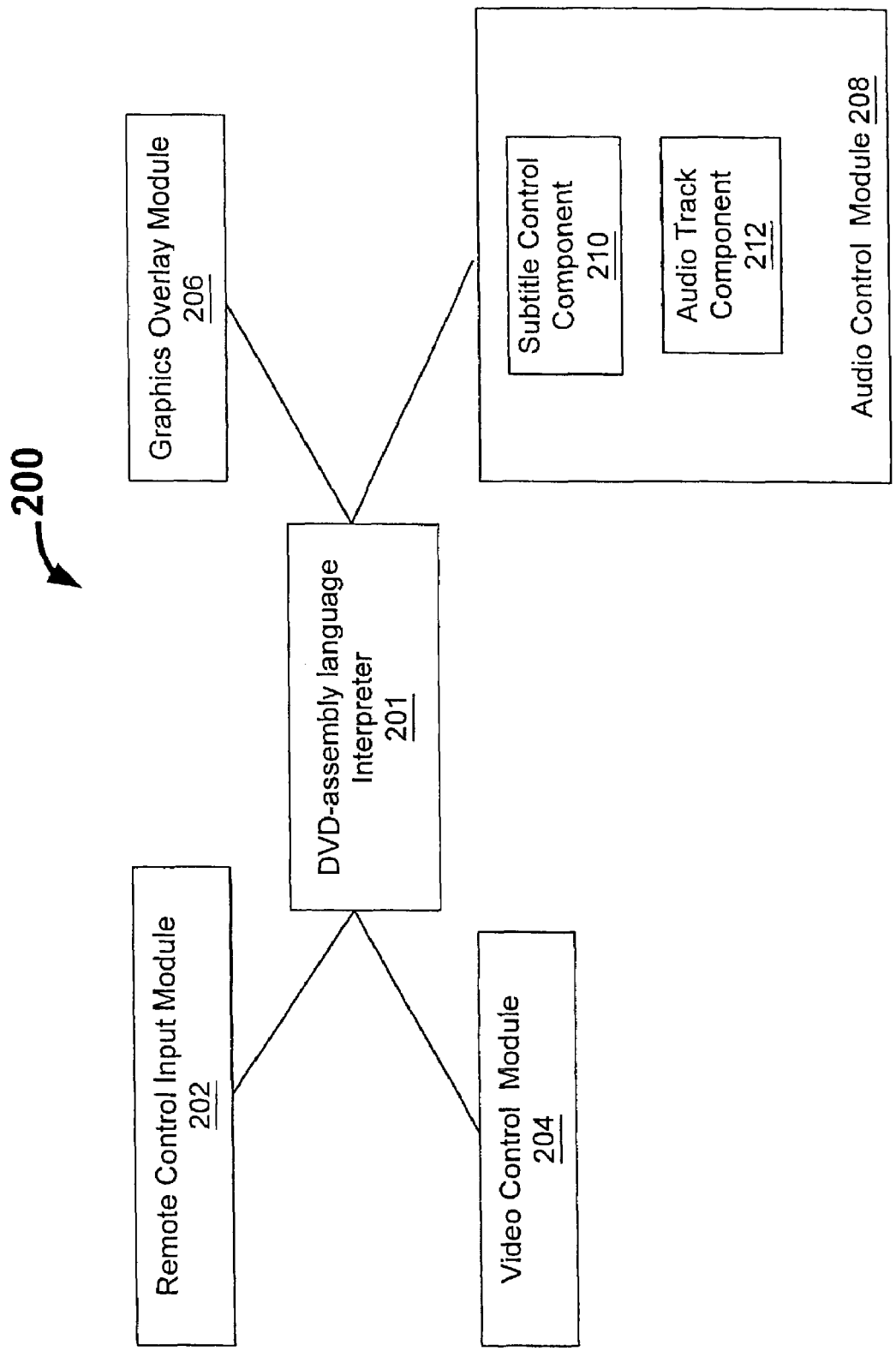
FIG. 2 illustrates a Java-based command/control enabling system including a DVD assembly language interpreter in accordance with one embodiment of the invention.

FIG. 2 illustrates a Java-based command/control enabling system 200 including a DVD assembly language interpreter 201 in accordance with one embodiment of the invention. The Java-based command/control enabling system 200 also includes a remote control input module 202, a video control module 204, a graphics (or text) overlay module 206, and an audio control module 208. The remote control input module 202 can receive input associated with command-control of a television receiver. This input can, for example, be transmitted by a remote control unit to the television receiver. In any case, the input can be represented as one or more key codes (remote control key codes). A key code can, in turn, be presented to a DVD assembly language program. This means that certain op-codes can form part of a program which recognizes the remote control key codes. As shown in FIG. 2, the remote control input module 202 can interact with the DVD assembly language interpreter 201. This allows the DVD assembly language interpreter 201 to interpret the DVD assembly language instruction in a program that reacts to from the remote control input module 202.

As will be appreciated by those skilled in the art, the video control module 204 and an audio control module 208 can be implemented to respectively control video and audio functions. These functions can be implemented similarly to functions provided by DVD units (i.e., similar to the functionality provided by DVD assembly language for controlling audio and video). Similarly, the graphics overlay module can be implemented to provide graphics overlay functions (e.g., highlighting the screen). It should be noted that each of the remote control input module 202, video control module 204, graphics overlay module 206, and audio control module 208 can include one or more subcomponents. For example, audio control module 208 includes a subtitle control component 210 and an audio track component 212.

It should be noted that the remote control input module 202 and graphics overlay module 206 can be implemented using a Java-based Abstract Windowing Tools (AWT) interface. Furthermore, in environments that support the Digital Video Broadcasting (DVB) or Multimedia Home Platform (MHP) standard, appropriate standard interfaces can be used. For example, for the subtitle control module, DAVIC standard can be used. Alternatively, a Networking API can be used to interact with the server (e.g., a Video on Demand server).

Figure 3:
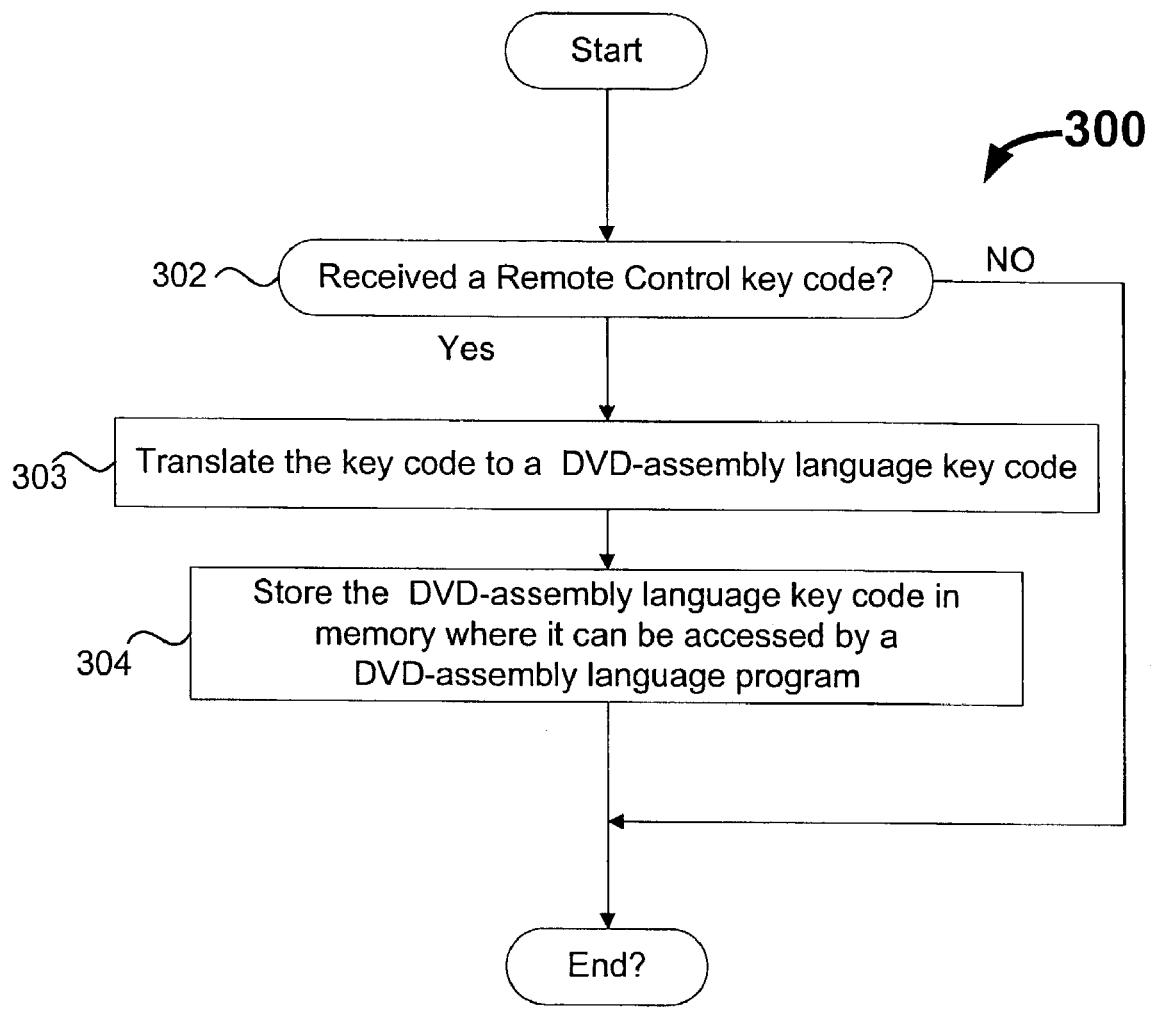
FIG. 3 illustrates a method for providing command/control capabilities for a television receiver in a Java TV environment that provides a Java TV Application Programming Interface.

FIG. 3 illustrates a method 300 for providing command/control capabilities for a television receiver in a Java TV environment that provides a Java TV Application Programming Interface. The method 300 can, for example, be used by the Java-based command/control enabling system 200 of FIG. 2. Initially, at operation 302, a determination is made as to whether a remote control key code is received. If it is determined at operation 302 that a remote control key code is not received, the method 300 ends. However, if it is determined at operation 302 that a remote control key code is received, the method 300 proceeds to operation 303 where the key code is translated to at least one DVD assembly language key code. Finally, at operation 304, the at least one DVD assembly language code which responsive to the remote control command is stored in memory where it can be accessed by a DVD assembly language program. As will be appreciated, a main interpreter loop can be developed which may include one or more DVD assembly language instructions that access the stored key code.

Figure 4:
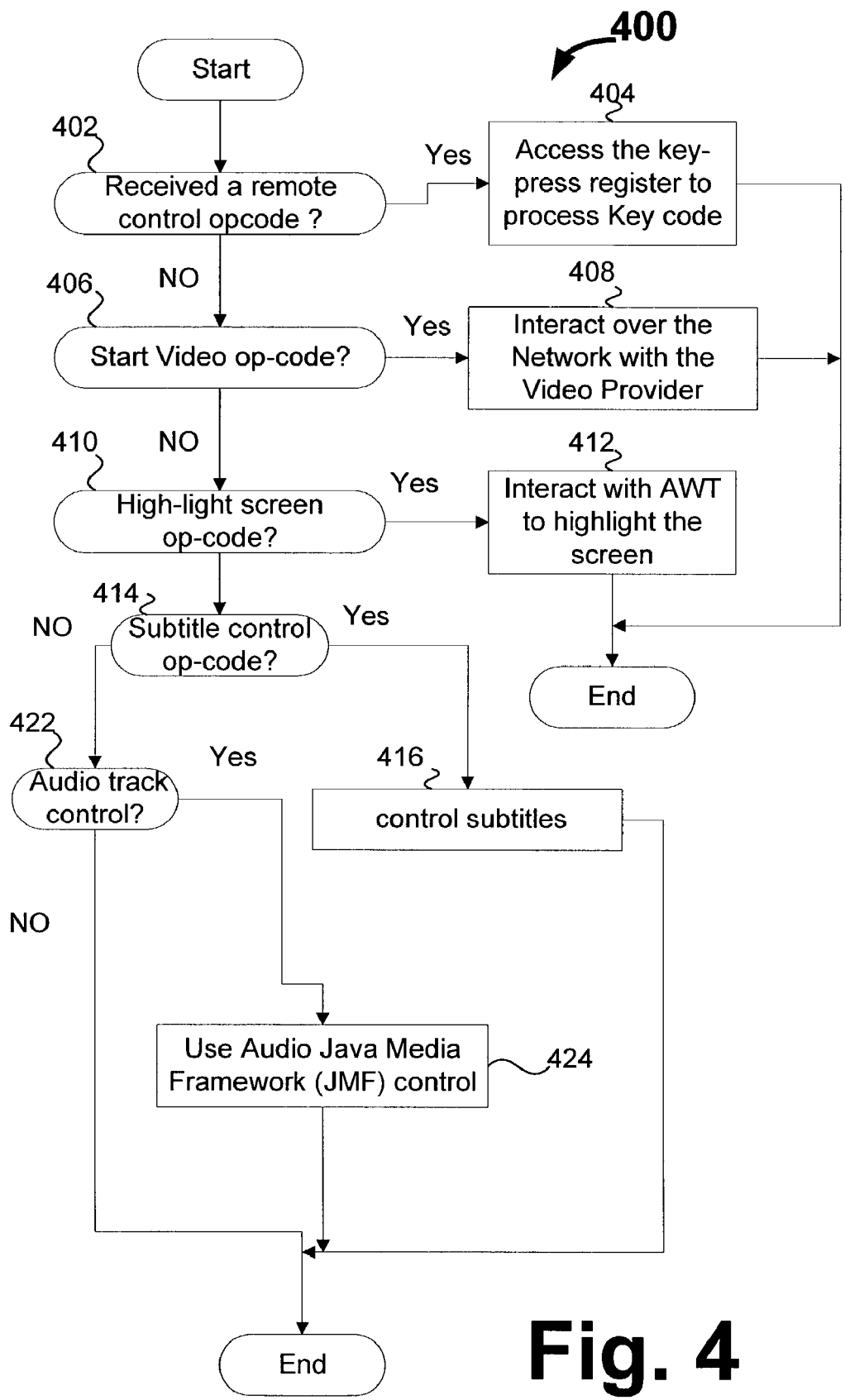
FIG. 4 illustrates a method for processing DVD assembly language op-codes in accordance with one embodiment of the invention.

FIG. 4 illustrates a method 400 for processing DVD assembly language op-codes in accordance with one embodiment of the invention. The method 400, for example, can be used by the DVD assembly language interpreter 201 of FIG. 2. Initially, at operation 402, a determination is made as to whether a remote control key press has been received. If it is determined at operation 402 that a remote control key press has been received, the method 400 proceeds to operation 404 where the key op-code is processed. The method 400 ends following operation 404. However, if it is determined at operation 402 that a remote control key press has not been received, the method 400 proceeds to operation 406 where it is determined whether a start video op-code has been received. If it is determined at operation 406 that a start video op-code has been received, the method 400 proceeds to operation 408 where a networking protocol is used to interact with the video provider. The method 400 ends following operation 408. On the other hand, if it is determined at operation 406 that a start video op-code has not been received, the method 400 proceeds to operation 410 where it is determined whether a highlight screen op-code has been received. If it is determined at operation 410 that a highlight screen op-code has been received, the method 410 proceeds to operation 412 where a Java-based AWT interface is used to highlight the screen. The method 400 ends following operation 412.

However, if it is determined at operation 410 that a highlight screen op-code has been not received, the method 400 proceeds to operation 414 where it is determined whether a subtitle control op-code has been received. If it is determined at operation 414 that a subtitle control op-code has been received, the method 400 proceeds to operation 416 where subtitle is controlled. In an embodiment of this invention which is implemented in an environment where the DAVIC subtitle control API is available, such as an environment based on the MHP standard, the DAVIC subtitle control is used to control subtitling. In another embodiment that is running in an environment where the DAVIC subtitle control API is not available, subtitles are controlled through another means. For example, a networking API could be used to send a control message to the server providing the video stream in a VOD service, requesting that the subtitles be changed as indicated by the user. In any case, the method 400 ends following either operation 416.

On the other hand, if it is determined at operation 414 that a subtitle control op-code has not been received, the method 400 proceeds to operation 422 where it is determined whether an audio track control op-code has been received. If it is determined at operation 422 that an audio track control op-code has not been received, the method 400 ends. However, if it is determined at operation 422 that an audio track control op-code has been received, the method 400 proceeds to operation 424 where Java Media Framework (JMF) control is used to process the audio track control op-code. The method 400 ends following operation 424.

Figure 5:
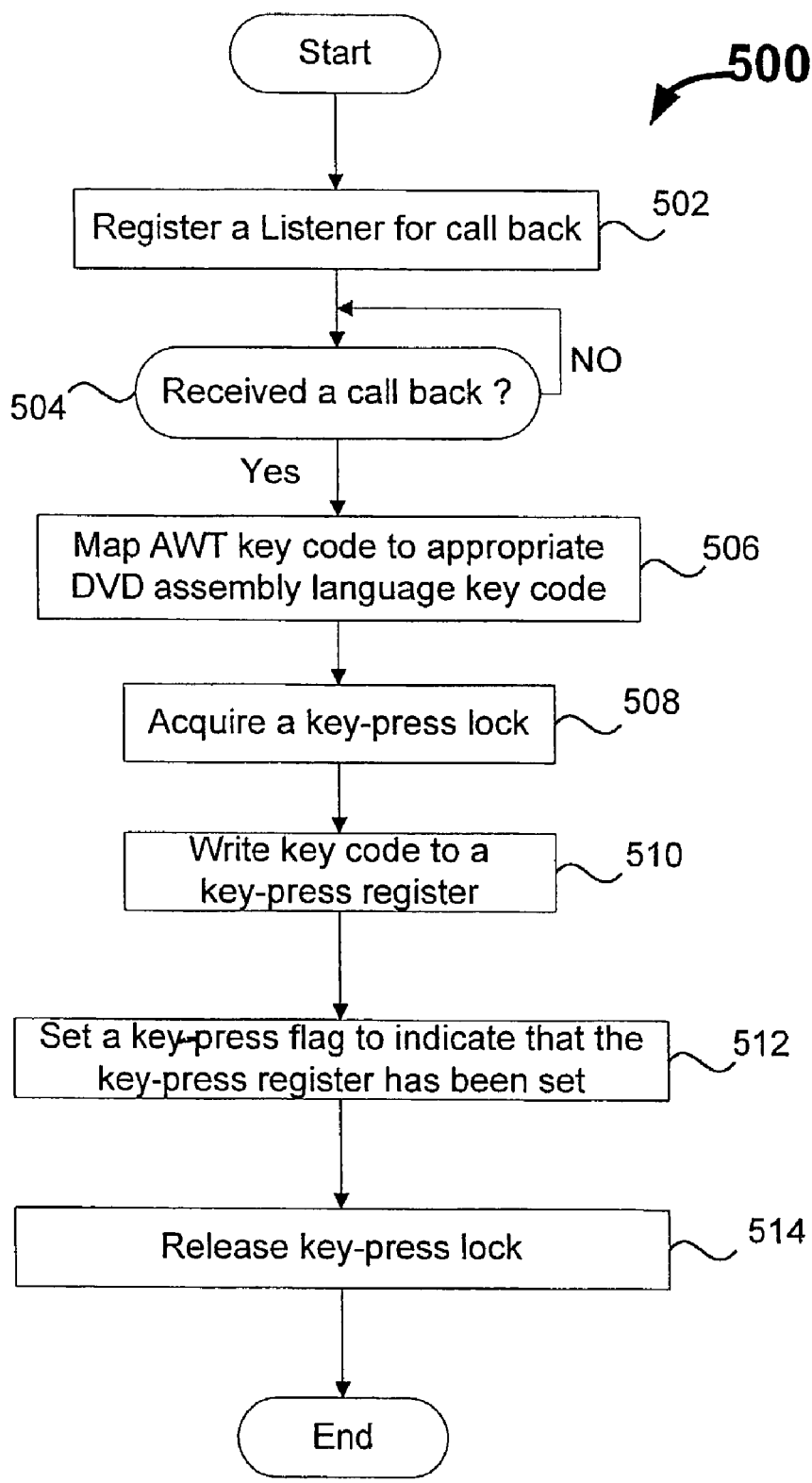
FIG. 5 illustrates a method for processing key op-codes in accordance with one embodiment of the invention.

FIG. 5 illustrates a method 500 for processing key op-codes in accordance with one embodiment of the invention. The method 500 can, for example, be used to process a key op-code received at operation 402 of FIG. 4. Initially, at operation 502, a listener for call back is registered. Next, at operation 504, a determination is made as to whether a call back is received. As will be appreciated by those skilled in the art, a call back is received when a key code for performing an operation associated with a TV receiver is entered. The key code can, for example, correspond to a key that is pressed on a remote control. As noted above, a Java-based AWT can be used to process the key code. As such, an AWT key code is received when the call back is received.

Accordingly, if it is determined at operation 504 that a call back has been received, the method 500 proceeds to operation 506 where a AWT key code is mapped to an appropriate DVD assembly language key code. Next, at operation 508, a key-press lock is acquired. Thereafter, at operation 510, the DVD assembly key code is written to a key-press register. After the DVD assembly key code is written, a key-press flag is set at operation 512 to indicate that the key-press register has been set. Finally, at operation 514, the key-press lock is released. The method 500 ends following operation 514.

Figure 6:
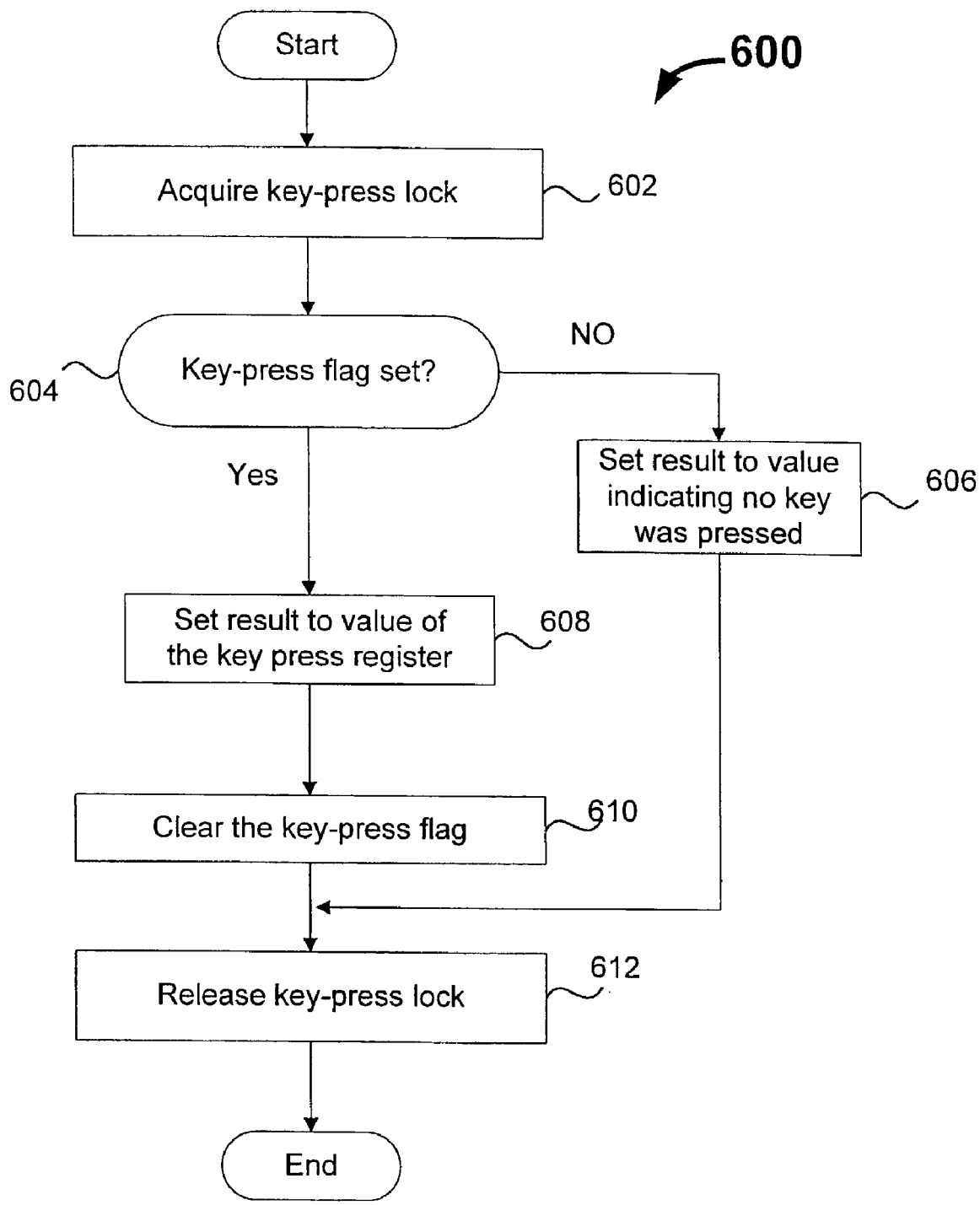
FIG. 6 illustrates a method for acquiring a key op-code in accordance with one embodiment of the invention.

FIG. 6 illustrates a method 600 for acquiring a key op-code in accordance with one embodiment of the invention. In the described embodiment, the key op-code has been written to a key-press register using, for example, the processing method 500 of FIG. 5. Initially, at operation 602, a key-press lock is acquired. Next, at operation 604, a determination is made as to whether the key-press flag has been set. If it is determined at operation 604 that the key-press flag has not been set, the method 600 proceeds to operation 606 where a result value is set to a value indicating that no key was pressed. Next, the method 600 proceeds to operation 612 where the key-press lock is released. The method 600 ends following operation 612. However, if it is determined at operation 604 that the key-press flag has been set, the method 600 proceeds to operation 608 where the result value is set to the value of the key-press register. Next, at operation 610 the key-press flag is cleared. Thereafter, at operation 612, the key-press lock is released. The method 600 ends following operation 612.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A processor implementing a Java-based command/control enabling system for a Java TV environment, wherein said remote Java-based command/control enabling system provides navigation of digital content received directly from a video-on-demand signal and a digital broadcast television signal and displayed by a TV receiver in said Java TV environment, said remote Java-based command/control enabling system provides a set of navigation functions provided by a DVD assembly language instruction set said Java-based command/control enabling system is capable of directly interacting with a Java TV Application Programming Interface (API) that interfaces with said television receiver in order to provide said navigation functions for said Java TV environment, said Java-based command/control enabling system arranged to:
receive a remote control key code associated with a navigation command for operating said television receiver in said Java TV environment, the television receiver and Java TV environment playing the video-on-demand signal or digital broadcast television signal, wherein said navigation command is provided by said DVD assembly language instruction set;
translate said remote control key code to a DVD assembly language instruction;
store the DVD-assembly language instruction in memory, wherein said memory can be accessed by a DVD-assembly language program;
decode said DVD assembly language instruction in order to determine a DVD assembly language op-code; and
execute said DVD assembly language op-code to initiate performing at least one navigation operation of said video-on-demand and digital broadcast television signal in said Java TV environment.

2. The processor as recited in claim 1, wherein said Java-based command/control enabling system comprises:
a DVD assembly language interpreter;
a remote control input module;
a video control module; and
an audio control module.

3. The processor as recited in claim 2, wherein said remote control input module is implemented using an Abstract Windowing Tool (AWT).

4. The processor as recited in claim 2, wherein said Java-based command/control enabling system further comprises:
a graphics overlay module.

5. The processor as recited in claim 4, wherein said graphics overlay module is implemented using an Abstract Windowing Tool (AWT).

6. The processor as recited in claim 2, wherein said audio control module comprises:
a subtitle control module; and
an audio track component module.

7. The processor as recited in claim 6, wherein said subtitle control module is implemented using an API.

8. The processor as recited in claim 6, wherein said audio control module is implemented using a Audio Media Framework.

9. The processor as recited in claim 2, wherein said DVD assembly language interpreter is implemented as a Virtual Machine.

10. A method of providing a Java-based command/control enabling system for a Java TV environment, wherein said Java-based command/control enabling system allows navigation of digital content received directly from a video-on-demand signal and a digital broadcast television signal and displayed by a TV receiver in said Java TV environment, said Java-based command/control enabling system provides a set of navigation functions provided by a DVD assembly language instruction set said Java-based command/control enabling system is capable of directly interacting with a Java TV Application Programming Interface (API) that interfaces with said television receiver in order to provide said navigation functions, said method comprising:
receiving a remote control key code corresponding to a command for performing an operation associated with a television receiver operating in said Java TV environment and playing the video-on-demand signal or digital broadcast television signal, wherein said command is provided by said DVD assembly language instruction set;
translating said remote control key code to a DVD-assembly language instruction;
storing the DVD-assembly language instruction in memory, wherein said memory can be accessed by a DVD-assembly language program;
interpreting said DVD-assembly language instruction by said DVD-assembly language program; and
performing said operation associated with said Java TV environment, thereby providing remote control capabilities of said video-on-demand and digital broadcast television signal in the Java TV environment.

11. The method as recited in claim 10, wherein said storing operates to store said remote control key code in a register.

12. The method as recited in claim 11, wherein said method further comprises:
registering a listener for receiving said remote control key code; and
receiving a call back from said registered listener.

13. The method as recited in claim 12, wherein said method further comprises:
mapping an Abstract Windowing Tool (AWT) key to a DVD assembly language key.

14. The method as recited in claim 13, wherein said method further comprises:
acquiring a key-press lock.

15. A computer readable medium including computer program code for a Java-based command/control enabling system capable of directly interacting with a Java TV Application Programming Interface (API) that interfaces with a television receiver in a Java TV environment in order to provide navigation functions and for the Java TV environment, said Java-based command/control enabling system allows navigation of a video-on-demand signal and a digital broadcast television signal displayed by a TV receiver in said Java TV environment, said computer readable medium comprises:

computer program code for receiving a remote control key code corresponding to a command for performing an operation associated with a television receiver operating in said Java TV environment and playing the video-on-demand signal or digital broadcast television signal, wherein said command is provided by a DVD assembly language instruction set;

computer program code for translating said remote control key code to a DVD-assembly language instruction;

computer program code for storing the DVD-assembly language instruction in memory, wherein said memory can be accessed by a DVD-assembly language program;

computer program code for interpreting said DVD-assembly language instruction by said DVD-assembly language program; and computer code for performing said operation associated with said Java TV environment, thereby providing remote control capabilities of the video-on-demand signal and the digital broadcast television signal in the Java TV environment.

16. The computer readable medium as recited in claim 15, wherein said computer readable medium further comprises:

computer program code for registering a listener for receiving the remote control key code as input; and computer program code for receiving a call back from said registered listener.

17. The computer readable medium as recited in claim 15, wherein said computer readable medium further comprises:

computer program code for mapping an Abstract Windowing Tool (AWT) key to a DVD assembly language key.

18. The computer readable medium as recited in claim 17, wherein said computer readable medium further comprises:

computer program code for acquiring a key-press lock.

\* \* \* \* \*